235-380
Y2587 OR 3,390,253
SEARCH ROOM

June 25, 1968 W. S. MILLER 3,390,253

LIGHT RESPONSIVE APPARATUS FOR COMPARING CARDS OR THE LIKE

Filed June 25, 1962

WENDELL S. MILLER
INVENTOR.

BY William P. Green
ATTORNEY

United States Patent Office
3,390,253
Patented June 25, 1968

3,390,253
LIGHT RESPONSIVE APPARATUS FOR COMPARING CARDS OR THE LIKE
Wendell S. Miller, 1341 Comstock Ave., Los Angeles, Calif. 90024
Filed June 25, 1962, Ser. No. 205,009
11 Claims. (Cl. 235—61.7)

This invention relates to improved apparatus for comparing two items, such as for comparing indicia formed on two cards or other sheets of material to see whether or not the indicia on the sheets are the same. Certain features of the invention have been disclosed and claimed in my copending application Ser. No. 184,432, filed Apr. 2, 1962 on "Selecting Apparatus," now Patent No. 3,254,201.

The general object of the invention is to provide a comparing arrangement which is capable of indicating in a positive manner whether or not there is complete correspondence between a set of indicia on one card or member and a set of indicia on another member. On each of these members there may be a series of locations at which indicia may be present in either of two conditions, so that the condition of the indicia at these different locations may represent a binary number. Preferably, the indicia are in the form of light transmitting areas, such as apertures formed in the card or sheet, or reflective areas on the card or sheet, with the apparatus being of a light responsive type capable of responding to the transmission of light through or by the card at different possible light transmission locations. As will appear, the apparatus of the invention is capable of indicating whether or not the condition of the two cards at a particular pair of the possible light transmission locations is the same or different, as to the capacity for transmission of light, with the overall result of attaining a full binary comparison of the sets of indicia on the two cards.

To provide for the above discussed type of response to light transmitted by different portions of the two cards or sheets, I utilize two similar sets or series of light responsive cells, preferably photovoltaic cells, associated with the two cards respectively. Each cell of a particular set is then connected into a circuit with a corresponding cell of the second set. The two corresponding cells are preferably connected into a closed loop circuit, in which the cells are in series with one another, so that when both are energized they produce a closed circulation of current within the loop, whereas when only one is energized it functions to produce a circulation of current in a circuit externally of the loop. When neither cell is illuminated, no current output is produced by the cells, so that the response is then the same as when both cells are simultaneously illuminated.

The external current may be utilized to operate suitable electrically actuated means, such as a light or other indicator. Also, in association with each loop circuit, there may be provided rectifying means, for causing the external current to flow in a predetermined direction regardless of which cell may be separately illuminated. Additionally, a reverse biasing battery may be connected into the overall circuit, in opposition to the current produced externally of the loop circuits.

The above and other features and objects of the present invention will be better understood from the following detailed description of the typical embodiment illustrated in the accompanying drawing, in which.

Figures 1, 2, 3, 4:
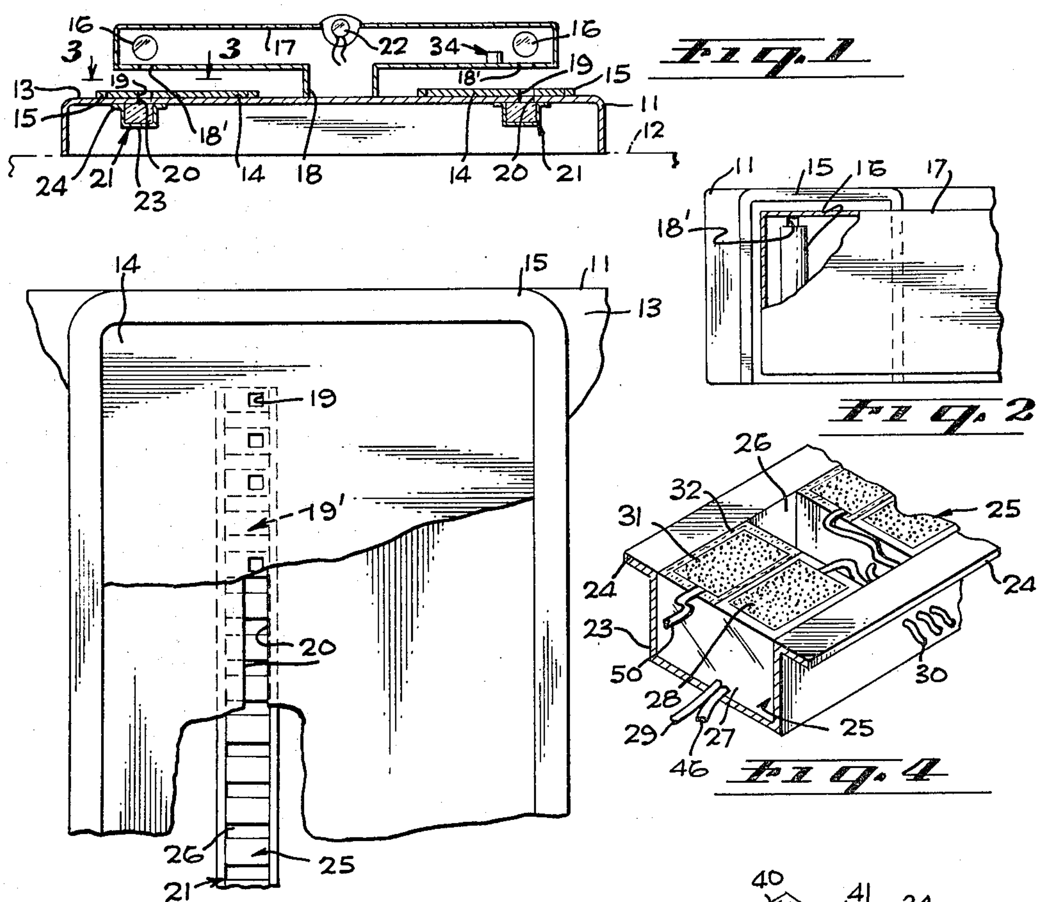
FIG. 1 is a vertical section through a card comparing device constructed in accordance with the invention.
FIG. 2 is a fragmentary plan view, partially broken away, of the FIG. 1 device.
FIG. 3 is an enlarged fragmentary view taken on line 3—3 of FIG. 1.
FIG. 4 is an enlarged fragmentary perspective view of one of the light responsive units of the FIG. 1 device.

With reference to FIG. 1, the typically illustrated comparing device embodying the invention may include a base 11 adapted to rest on a support surface 12 and having an upper horizontal wall 13 on which two cards or sheets 14 to be compared are removably positionable. One of these cards 14 may for example be a conventional credit card, having markings on it designating the holder of the card and various information concerning the holder; while the other card 14 may be a reference card or sheet having indicia on it designating a particular card holder whose credit card should be picked up, not honored, or otherwise treated specially for some reason. Whenever a card is presented to an operator at the time of purchase, the operator may place it in the apparatus and compare it with the reference card held by the apparatus at the second location, to see whether credit should be given.

The two cards 14 may be held in predetermined examination positions on the upper surface of wall 11, as by reception within two peripheral locating frames 15 shaped in correspondence with the cards.

Above the two cards, there are mounted two horizontally elongated light bulbs 16, which may be contained within an upper housing 17 mounted at 18 to the central portion of base structure 11. The light bulbs 16 are electrically energized to produce light passing downwardly through two horizontally elongated slits 18' in housing 17, then passing downwardly through apertures 19 formed in cards 14, and through horizontally elongated slits 20 formed in top wall 13 of the base structure, to impinge upon two light responsive units 21 secured to the underside of housing wall 13. Units 21 function to control the energization of an indicator light 22 which is illuminated as long as there are present in the apparatus two cards whose light transmission areas (apertures 19) do not correspond exactly in spacing. Light 22 goes out, however, whenever the pattern of light passing areas 19 on one card corresponds exactly with the pattern of such areas on the other card.

Each of the light responsive units 21 includes an elongated channel shaped housing element 23 which may have a pair of flanges 24 suitably secured to the underside of wall 13. The channel element 23 and wall 13 may both be formed of electrically nonconductive material, such as a suitable resinous plastic material. Within each of the elements 23, there are contained a series of light responsive assemblies 25 (see FIGS. 3 and 4), which may be spaced from one another at 26, and are located directly beneath a series of possible locations for the apertures 19 in the associated card 14. Thus, wherever an aperture 19 is present in one of the cards 14, light from bulb 16 may pass downwardly through that aperture and through slot 20 in wall 13 to impinge on and energize an associated one of the light responsive assemblies 25. In instances in which an aperture is not present at one of the possible aperture locations on one of the cards 13, for example at the location 19' in FIG. 3, the presence of the opaque material of the card across the path of light to the corresponding assembly 25 prevents the transmission of light through the card to that assembly, and thereby prevents illumination and energization of that assembly.

The number of individual light responsive assemblies 25 in each of the two units 21 is the same. Preferably, each of these assemblies 25 takes the form of a block 27 of "N" doped silicon, having a thin layer 28 of "P" silicon coating a portion of its upper surface, say about half of that surface. The apertures 19 in the card are positioned to direct the light from lamp 16 onto the coated area 28, which is light sensitive, so that an electrical potential is developed by the photovoltaic cell 27–28 as a result of the impingement of this light on coating 28. The leads from the unit 25 are represented at 29, 30, 46 and 50, and are connected to the rest of the circuitry in a manner to be discussed later.

In addition to serving as a photovoltaic cell, the assembly 25 may also function as an associated rectifier, and for this purpose may have coated on the second half of the upper surface of block 27, but suitably spaced and insulated from coating 28, a second layer of "P" silicon 31, which in this case is covered over with an opaque non-light-transmitting paint or other covering material 32 for preventing the illumination of substance 31, and thereby assuring that the substance will not function as a photovoltaic cell but only as a rectifier. All of the various assemblies 25 may be of identical materials and dimensions to have identical electrical characteristics, so that the various photovoltaic cells 27–28 may be balanced in the overall circuit.

Figures 5, 6:
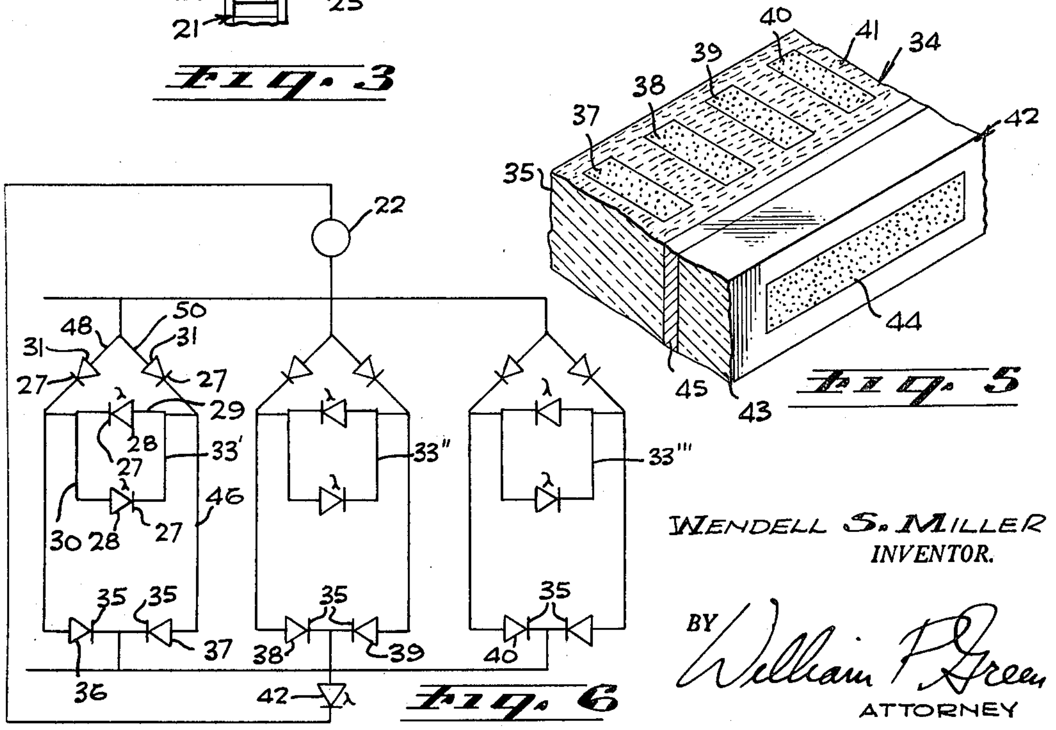
FIG. 5 is a fragmentary view of the reverse biasing battery and associated rectifiers.
FIG. 6 is a circuit diagram illustrating the overall circuit of the apparatus.

Referring now to the circuit diagram of FIG. 6, attention is directed to the fact that this diagram contains a number of closed loop circuits 33′, 33″, 33‴, etc., each containing two of the discussed photovoltaic cells connected in series with one another. More specifically, the two cells 27–28 in each of the loops 33′, 33″, 33‴, etc. are two correspondingly positioned photovoltaic cells of the two units 21 respectively. For example, the two cells 27–28 of circuit 33′ in FIG. 6 may typically be end ones of the assemblies 25 in the two units 21, while the two cells in loop 33″ may be correspondingly positioned second cells of units 21, and the cells in circuit 33‴ may be the third cells in units 21, etc., with as many loops being present as there are pairs of photovoltaic cells in the units 21.

Each of the loops 33′, 33″, 33‴, etc. has associated with it four rectifiers or diodes, connected into the rectifying circuit represented in FIG. 6. The two upper rectifiers are those previously discussed as formed by the blocks 27 and coatings 31, so that each of the assemblies 25 functions as one of the photovoltaic cells within a loop 33′ or the like, and an associated one of the upper rectifiers. The lower rectifiers in the various circuits associated with the different loops 33′, etc. may all be formed by a single assembly such as that represented at 34 in FIG. 5, this assembly consisting of an elongated block "N" doped silicon 35 having a series of "P" silicon areas provided at 37, 38, 39, 40 etc. on its surface, with all of the areas 37 through 40, etc. covered by an opaque paint or coating material 41 to prevent them from being light responsive. The single block 35 then forms the "N" side of all of the pairs of lower rectifiers, while the elements 37, 38, etc. form the positive sides of these rectifiers.

For introducing a reverse bias into the circuit of FIG. 6, there is provided a biasing battery 42, which may be a photovoltaic cell mounted to the side of block 35 (FIG. 5), and including a base 43 of "N" silicon and a coating 44 of "P" silicon which is light responsive. The cell 42 is insulated from block 35, as by an insulative connecting layer 45, and is connected into a series circuit with indicating lamp 22, with the various individual loops 33′, etc. and their associated rectifier arrangements being connected into this circuit in parallel with one another. The biasing battery 42 produces a potential which is less than that produced by the photovoltaic cells 27–28, so that these cells may overcome the opposition of the battery or photovoltaic cell 42. For example, cell 42 may be adapted to produce .5 volt, while cells 27–28 are each individually capable of producing approximately one full volt. Cell 42 may be energized by exposure to light from one of the lamps 16, so that if lamps 16 are on, the cell 42 will produce a reverse biasing voltage.

Describing now the operation of the apparatus, assume that bulbs 16 are turned on, and it is desired to compare the pattern of apertures 19 in one of the cards 14 with the aperture pattern in the second card. To compare the cards, it is necessary merely to place the cards in their respective locating frames 15, and the condition of bulb 22 will then indicate whether or not the pattern of apertures in one card corresponds exactly to that in the other. If the apertures do correspond, the bulb will not be illuminated, whereas if the apertures do not correspond the bulb will be illuminated.

This operation of indicator light 22 is attained as follows: if the two photovoltaic cells 27–28 of one of the loops 33′, 33″, or the like, are both located beneath unapertured areas of their respective cards, neither will produce an output potential, and therefore neither can cause current to flow through lamp 22 to illuminate it. If one of these photovoltaic cells but not the other is illuminated, current will flow through bulb 22. As an example, if the upper one of the cells 27–28 in loop 33′ is illuminated, current will flow to the right through that cell, then downwardly through lead 46 and the rectifier of which element 37 is a part, then through cell 42 and lead 47 to lamp 22, and ultimately back through lead 48 and the associated diode 31–27 to the energizing photovoltaic cell 27–28. Similarly, if the other of the two photovoltaic cells is energized, current will be forced in a leftward direction by that cell, and will flow through the other two rectifiers associated with the loop in question, to again produce a current downwardly through cell 42 and then through lamp 22 and back to the energizing photovoltaic cell 27–28. The rectifier circuit in this way assures that the current flowing through cell 42 and lamp 22 is always in a predetermined direction. When only one of the two cells 27–28 in a particular loop 33′ or the like is energized, the other cell in that loop functions as a rectifier to prevent the circulation of the generated current through that other cell.

When both cells of a particular loop 33′ or the like are simultaneously illuminated, they both develop potentials, but these potentials are in a direction such that they merely cause current to flow with very little resistance about the closed loop itself, so that the current does not reach the external circuit containing lamp 22, and does not energize the lamp.

Lamp 22 is so selected that the output produced by any one of the loops 33′ or the like, over and above the biasing voltage of cell 42, when only one of the cells of that loop is illuminated, is ample to visibly light bulb 22. Thus, if the aperture patterns on the cards 14 do not correspond at any one aperture location, the associated loop 33′ or the like will produce an output current lighting bulb 22 to indicate the lack of correspondence to the operator.

I claim:

1. Apparatus including a first photovoltaic cell, a second photovoltaic cell, electrical circuitry responsive to both of said cells and actuable to a first condition when neither of said cells is illuminated or when both are illuminated, and to a second and different condition when only one of said cells is illuminated, said circuitry including a closed loop circuit having said two photovoltaic cells connected in series with one another in additive relation so that both cells tend when illuminated to generate currents flowing in the same direction about said loop, said series connected cells being adapted to produce a closed circulation of current within said loop when both cells are illuminated, but to produce a circulation of current externally of said loop when only one cell is illuminated, means responsive to said external circulation of current, and rectifier means for preventing said external circulation of current from flowing through said last mentioned means except in a predetermined single direction.

2. Apparatus including a first photovoltaic cell, a second photovoltaic cell, electrical circuitry responsive to both of said cells and actuable to a first condition when neither of said cells is illuminated or when both are illuminated, and to a second and different condition when only one of said cells is illuminated, said circuitry including a closed loop circuit having said two photovoltaic cells connected in series with one another in additive relation so that both cells tend when illuminated to generate currents flowing in the same direction about said loop, said series connected cells being adapted to produce a closed circulation of current within said loop when both cells are illuminated, but to produce a circulation of current externally of said loop when only one cell is illuminated, a source of biasing potential which is in opposition to said external circulation of current and is independent of current flow through said source for maintenance of a biasing potential sufficient to prevent spurious currents externally of said loop when both cells are illuminated, and means responsive to said external circulation of current.

3. Apparatus including a first photovoltaic cell, a second photovoltaic cell, electrical circuitry responsive to both of said cells and actuable to a first condition when neither of said cells is illuminated or when both are illuminated, and to a second and different condition when only one of said cells is illuminated, said circuitry including a closed loop circuit having said two photovoltaic cells connected in series with one another in additive relation so that both cells tend when illuminated to generate currents flowing in the same direction about said loop, said series connected cells being adapted to produce a closed circulation of current within said loop when both cells are illuminated, but to produce a circulation of current externally of said loop when only one cell is illuminated, electrically actuated means responsive to said external circulation of current, and rectifying means for rectifying the output from said loop so that said external current flows in a predetermined common direction regardless of which of said cells is illuminated separately from the other.

4. Apparatus including a first photovoltaic cell, a second photovoltaic cell, electrical circuitry responsive to both of said cells and actuable to a first condition when neither of said cells is illuminated or when both are illuminated, and to a second and different condition when only one of said cells is illuminated, said circuitry including a closed loop circuit having said two photovoltaic cells connected in series with one another in additive relation so that both cells tend when illuminated to generate currents flowing in the same direction about said loop, said series connected cells being adapted to produce a closed circulation of current within said loop when both cells are illuminated, but to produce a circulation of current externally of said loop when only one cell is illuminated, means responsive to said external circulation of current, each of said cells comprising two components one applied as a localized light responsive coating on the other, said circuitry including a rectifier for rectifying said external current and formed by providing a second localized coating on said other component of the cell and coacting therewith to pass current in only one direction.

5. Apparatus including a first photovoltaic cell, a second photovoltaic cell, each of said cells having a positive side and a negative side when illuminated, electrical circuitry responsive to both of said cells and actuable to a first condition when neither of said cells is illuminated or when both are illuminated, and to a second and different condition when only one of said cells is illuminated, said circuitry including a closed loop circuit having said two photovoltaic cells connected in series with one another in additive relation so that both cells tend when illuminated to generate currents flowing in the same direction about said loop, said series connected cells being adapted to produce a closed circulation of current within said loop when both cells are illuminated, but to produce a circulation of current externally of said loop when only one cell is illuminated, electrically actuated means responsive to said external circulation of current, first and second conductors for conducting said external current from and to said electrically actuated means, a first rectifier operable to pass current from said conductor to a first point in said loop at the positive side of said first cell and the negative side of said second cell, a second rectifier operable to pass current from said first point to said second conductor, a third rectifier operable to pass current from said first conductor to a second point in the loop at the negative side of said first cell and the positive side of said second cell, and a fourth rectifier operable to pass current from said second point to said second conductor.

6. Apparatus for comparing a first member having a plurality of light transmitting areas arranged in a significant pattern with a second member having a plurality of light transmitting areas arranged in a significant pattern, said apparatus including a first series of light responsive cells positioned to respond respectively to the transmission of light by said first member at a series of possible locations for the light transmitting areas thereon, a second series of light responsive cells positioned to respond respectively to the transmission of light by said second member at a series of corresponding possible locations for the light transmitting areas thereon, and electrical circuitry responsive to both of said series of cells and actuable to a first condition when for each cell which is illuminated in one series a corresponding cell in the other series is illuminated, but actuable to a second condition when any cell in one series is illuminated without the corresponding cell in the other series.

7. Apparatus for comparing a first member having a plurality of light transmitting areas arranged in a significant pattern with a second member having a plurality of light transmitting areas arranged in a significant pattern, said apparatus including a first series of photovoltaic cells positioned to respond respectively to the transmission of light by said first member at a series of possible locations for the light transmitting areas thereon, a second series of photovoltaic cells positioned to respond respectively to the transmission of light by said second member at a series of corresponding possible locations for the light transmitting areas thereon, and electrical circuitry responsive tc both of said series of cells and actuable to a first condition when for each cell which is illuminated in one series a corresponding cell in the other series is illuminated, but actuable to a second condition when any cell in one series is illuminated without the corresponding cell in the other series, said circuitry including a plurality of closed loop circuits each including two corresponding photovoltaic cells of said two series of cells connected in series with one another in additive relation so that both cells tend when illuminated to generate currents flowing in the same direction about said loop, said series connected cells being adapted to produce a closed circulation of current within said loop when both cells thereof are illuminated, but to produce a circulation of current externally of the loop when only one cell thereof is illuminated, and means responsive to said external circulation of current from any of said loops.

8. Apparatus for comparing a first member having a plurality of light transmitting areas arranged in a significant pattern with a second member having a plurality of light transmitting areas arranged in a significant pattern, said apparatus including a first series of photovoltaic cells positioned to respond respectively to the transmission of light by said first member at a series of possible locations for the light transmitting areas thereon, a second series of photovoltaic cells positioned to respond respectively to the transmission of light by said second member at a series of corresponding possible locations for the light transmitting areas thereon, and electrical circuitry responsive to both of said series of cells and actuable to a first condition when for each cell which is illuminated in one series a corresponding cell in the other series is illuminated, but actuable to a second condition when any cell in one series is illuminated without the corresponding cell in the other series, said circuitry including a plurality of closed loop circuits each including two corresponding photovoltaic cells of said two series of cells connected in series with one another in additive relation so that both cells tend when illuminated to generate currents flowing in the same direction about said loop, said series connected cells being adapted to produce a closed circulation of current within said loop when both cells thereof are illuminated, but to produce a circulation of current externally of the loop when only one cell thereof is illuminated, a source of biasing potential in opposition to said external circulation of current, and means responsive to said external circulation of current from any of said loops.

9. Apparatus for comparing a first member having a plurality of light transmitting areas arranged in a significant pattern with a second member having a plurality of light transmitting areas arranged in a significant pattern, said apparatus including a first series of photovoltaic cells positioned to respond respectively to the transmission of light by said first member at a series of possible locations for the light transmitting areas thereon, a second series of photovoltaic cells positioned to respond respectively to the transmission of light by said second member at a series of corresponding possible locations for the light transmitting areas thereon, and electrical circuitry responsive to both of said series of cells and actuable to a first condition when for each cell which is illuminated in one series a corresponding cell in the other series is illuminated, but actuable to a second condition when any cell in one series is illuminated without the corresponding cell in the other series, said circuitry including a plurality of closed loop circuits each including two corresponding photovoltaic cells of said two series of cells connected in series with one another in additive relation so that both cells tend when illuminated to generate currents flowing in the same direction about said loop, said series connected cells being adapted to produce a closed circulation of current within said loop when both cells thereof are illuminated, but to produce a circulation of current externally of the loop when only one cell thereof is illuminated, electrically actuated means responsive to said external circulation of current from any of said loops, and rectifying means associated with each loop for rectifying the output therefrom so that said external current flows in a predetermined common direction regardless of which of the cells of that loop is illuminated separately from the other.

10. Apparatus for comparing a first member having a plurality of light transmitting areas arranged in a significant pattern with a second memer having a plurality of light transmitting areas arranged in a significant pattern, said apparatus including a first series of photovoltaic cells positioned to respond respectively to the transmission of light by said first member at a series of possible locations for the light transmitting areas thereon, a second series of photovoltaic cells positioned to respond respectively to the transmission of light by said second member at a series of corresponding possible locations for the light transmitting areas thereon, each of said cells having a positive side and a negative side when illuminated, and electrical circuitry responsive to both of said series of cells and actuable to a first condition when for each cell which is illuminated in one series a corresponding cell in the other series is illuminated, but actuable to a second condition when any cell in one series is illuminated without the corresponding cell in the other series, said circuitry including a plurality of closed loop circuits each including two corresponding photovoltaic cells of said two series of cells connected in series with one another in additive relation so that both cells tend when illuminated to generate currents flowing in the same direction about said loop, said series connected cells being adapted to produce a closed circulation of current within said loop when both cells thereof are illuminated, but to produce a circulation of current externally of the loop when only one cell thereof is illuminated, electrically actuated means responsive to said external circulation of current from any of said loops, and rectifying means associated with each loop for rectifying the output therefrom so that said external current flows in a predetermined common direction regardless of which of the cells of that loop is illuminated separately from the other, said rectifying means associated with each loop including first and second conductors for conducting said external curcurrent from and to said electrically actuated means, a first rectifier operable to pass current from said first conductor to a first point in said loop at the positive side of said first cell and the negative side of said second cell, a second rectifier operable to pass current from said first point to said second conductor, a third rectifier operable to pass current from said first conductor to a second point in the loop at the negative side of said first cell and the positive side of said second cell, and a fourth rectifier operable to pass current from said second point to said second conductor.

11. Apparatus as recited in claim 10, including a light energized biasing battery opposing the flow of said external current to said electrically actuated means.

References Cited

UNITED STATES PATENTS 3,024,981 3/1962 Allen -------------- 235—61.7
2,922,894 1/1960 Kerr et al. -------- 250—219.4

MAYNARD R. WILBUR, *Primary Examiner.*

E. M. RONEY, T. J. SLOYAN, *Assistant Examiners.*